(12) United States Patent
Jeong et al.

(10) Patent No.: US 12,420,628 B2
(45) Date of Patent: Sep. 23, 2025

(54) ACTIVE AIR FLAP SYSTEM FOR VEHICLE

(71) Applicants: Hyundai Motor Company, Seoul (KR); Kia Corporation, Seoul (KR); HYUNDAI MOBIS CO., LTD., Seoul (KR)

(72) Inventors: Phil-Jung Jeong, Seongnam-Si (KR); Kyeong-Am Lee, Yongin-Si (KR); Jae-Sup Byun, Seongnam-Si (KR)

(73) Assignees: Hyundai Motor Company, Seoul (KR); Kia Corporation, Seoul (KR); HYUNDAI MOBIS CO., LTD., Seoul (KR)

( * ) Notice: Subject to any disclaimer, the term of this patent is extended or adjusted under 35 U.S.C. 154(b) by 461 days.

(21) Appl. No.: 17/895,981

(22) Filed: Aug. 25, 2022

(65) Prior Publication Data
US 2023/0182563 A1    Jun. 15, 2023

(30) Foreign Application Priority Data
Dec. 15, 2021    (KR) .......................... 10-2021-0179794

(51) Int. Cl.
B60K 11/08    (2006.01)
(52) U.S. Cl.
CPC .................................. B60K 11/085 (2013.01)

(58) Field of Classification Search
CPC .......... B60K 11/085; B60K 11/08; F01P 7/10
See application file for complete search history.

(56) References Cited

U.S. PATENT DOCUMENTS 10,118,480 B2 *  11/2018  Yasui ................... B60K 11/085
11,987,116 B2 *   5/2024  Müller .................... B60R 19/52

FOREIGN PATENT DOCUMENTS

KR    10-2011-0134698 A    12/2011

* cited by examiner

*Primary Examiner* — James A Shriver, II
*Assistant Examiner* — Nicholas R. Kandas
(74) *Attorney, Agent, or Firm* — MORGAN, LEWIS & BOCKIUS LLP

(57) ABSTRACT

An active air flap system mounted in a predetermined portion of a vehicle, includes: a housing, a flap mounted on the housing to be relatively movable, an actuator coupled to the at least one flap and configured to drive the at least one flap, and a power transfer mechanism engaging the actuator and the flip and configured to transfer power from the actuator to the at least one flap so that the at least one flap performs a dual operation of a sliding movement operation and a rotation operation of rotating around a predetermined rotation axis, preventing the occurrence of design heterogeneity and the air resistance caused by forming the space between the at least one flap and the radiator grill, and improving shielding properties.

15 Claims, 17 Drawing Sheets

Prior Art

Prior Art

Prior Art

ACTIVE AIR FLAP SYSTEM FOR VEHICLE

CROSS-REFERENCE TO RELATED APPLICATION

The present application claims priority to Korean Patent Application No. 10-2021-0179794, filed on Dec. 15, 2021, the entire contents of which is incorporated herein for all purposes by this reference.

BACKGROUND

Field of the Present Disclosure

The present disclosure relates to an active air flap system for a vehicle, and to an active air flap system for a vehicle, which can prevent the occurrence of design heterogeneity and an air resistance caused by forming a space between a flap and a radiator grill, and improve shielding properties.

Description of Related Art

A power mechanism such as an internal combustion engine (internal combustion engine vehicle) or an electric motor (electric vehicle) may be accommodated in a front portion of a vehicle, and a plurality of heat exchangers such as a radiator, a condenser, and an intercooler may be accommodated therein. As shown in FIG. 12A and FIG. 12B, a grill 1 such as a radiator grill is mounted on a front side of the vehicle to protect the aforementioned components provided in the front portion of the vehicle. Furthermore, to cool the internal combustion engine, the electric motor, the heat exchanger, etc., the grill 1 is formed with a plurality of vents through which outside air can pass.

Meanwhile, when the vehicle travels at a low speed, the flow rate of the outside air flowing into the front portion of the vehicle through the vents is relatively small, and when the vehicle travels at a high speed, the flow rate of the outside air flowing into the front side of the vehicle through the vents of the grill may be relatively large.

When the flow rate of the outside air flowing into the front side of the vehicle through the vents of the grill 1 is large, the cooling performance (and heat damage prevention performance) may be improved, but on the contrary, the aerodynamic characteristics of the vehicle may be lowered due to an increase in the flow rate of the outside air. On the other hand, when the flow rate of the outside air flowing into the front side of the vehicle through the vents of the grill 1 is relatively small, the cooling performance (and heat damage prevention performance) may be lowered whereas the aerodynamic performance of the vehicle may be improved.

As described above, the flow rate of the outside air is changed depending upon a speed change of the vehicle, and the cooling performance and the aerodynamic performance can conflict with each other depending upon the change in the flow rate of the outside air.

To overcome the present point, a technology is known to apply an active air flap system configured to adjust the opening/closing of an air flap depending upon the speed of the vehicle, the outside air temperature, etc. To appropriately adjust the flow rate of the outside air, the inflow direction of the outside air, etc., compromising cooling performance and aerodynamic performance that conflict with each other.

FIG. 12A and FIG. 12B show an opening/closing operation of the conventional active air flap system.

The conventional active air flap system rotates a flap 2 around a predetermined rotation axis positioned on a sealing duct 3 behind the grill 1 of the front portion of the vehicle to switch the flap 2 between a closed state (FIG. 12A) and an opened state (FIG. 12B). When a rotation angle of the flap 2 is appropriately controlled at the instant time, the amount and direction of air flowing into the front portion of the vehicle through the vents of the grill 1 may be adjusted depending upon an outside air temperature, a coolant temperature, a vehicle speed, etc. Therefore, it is possible to actively compromise cooling performance and aerodynamic performance.

However, as described above, the conventional active air flap system allows the flap 2 to simply rotate around the predetermined rotation axis at a fixed position when the flap 2 is operated.

Therefore, there is a concern that the flap 2 will interfere with the vents of the grill 1 when the flap 2 rotates if the flap 2 is close to the vents of the grill 1 and a shape of a front surface of the flap 2 is formed to correspond to a shape of the front surface of the vents of the grill 1 according to the request in terms of design or for the compactness of a vehicle body.

Therefore, to prevent the occurrence of the aforementioned interference in advance, as shown in FIG. 10A, it is necessary to maintain a predetermined gap 4 between the flap 2 and the vents of the grill 1 in a state where the flap 2 is closed.

However, in the instant case, as also shown in FIG. 10A, when the vehicle is viewed from the outside, a step inevitably occurs between the grill 1 and the flap 2. Therefore, the grill 1 and the flap 2 do not harmonize with each other, causing design heterogeneity.

Furthermore, the outside air is introduced through the gap 4 even in the state where the flap 2 is closed, causing a loss of an aerodynamic force in a certain portion.

Furthermore, because the flow is stagnant in the gap 4, a high-pressure region is formed around the flap 2 around the gap 4. Therefore, there can occur a problem in that since the flap 2 is forcibly opened by the wind during high-speed traveling, a driving device of the flap 2 is damaged or the flap 2 is not appropriately controlled.

The contents described in Description of Related Art are to help the understanding of the background of the present disclosure, and may include what is not previously known to those skilled in the art to which the present disclosure pertains.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an active air flap system for a vehicle, which can prevent the occurrence of design heterogeneity and an air resistance caused by forming a space between a flap and a radiator grill, and improve shielding properties.

An active air flap system mounted in a front portion of a vehicle according to an exemplary embodiment of the present disclosure for achieving the object includes: a housing, a flap mounted on the housing to be relatively movable, an actuator coupled to at least one flap and configured to drive the at least one flap, and a power transfer mechanism engaging the actuator and the flip and configured to transfer power from the actuator to the at least one flap so that the at least one flap performs a dual operation of a sliding movement operation and a rotation operation of rotating around a predetermined rotation axis.

As described above, the present disclosure performs a dual operation of retreating the at least one flap backward in the front and rear direction of the vehicle and then rotating with respect to the predetermined rotation axis when opening or closing vents of a grill using the at least one flap, without only rotating at a fixed position as in the conventional one. Therefore, because there is no concern in which the at least one flap will be in contact with the vents of the grill when performing an opening or closing operation, it is not necessary to have a gap between the at least one flap and the vents as in the conventional one. Therefore, it is possible to effectively suppress the loss of aerodynamic performance due to the occurrence of the leakage through the gap between the vents of the grill and the at least one flap as in the conventional one.

The at least one flap may be configured so that the at least one flap of the active air flap system covers vents formed on an external surface of the predetermined portion of the vehicle, and the at least one flap may be provided with a protrusion including a shape corresponding to the vents.

As described above, because the at least one flap has the shape corresponding to the vents, the at least one flap may be further in close contact with the vents, improving shield properties. Furthermore, the grill and the at least one flap can give the integral aesthetic sense as a whole.

The at least one flap may include: a first flap pin and a second flap pin provided on at least one side in a width direction of the vehicle in a first direction, respectively, and the housing may include: a first guide hole including a first flap pin inserted therein and extending in a front and rear direction of the vehicle, and a second guide hole into which the second flap pin is coupled and including a linear section extending in a same direction as the front and rear direction of the first guide hole and a rotation section with an arc shape which extends integrally from the linear section.

Furthermore, the rotation operation of the dual operation may be an operation in which the at least one flap rotates around the first flap pin in a state where the first flap pin is positioned on a rear end portion of the first guide hole in the front and rear direction of the vehicle.

The connection structure between the at least one flap and the housing as described above may be provided, implementing the aforementioned dual operation of the at least one flap in a simple structure.

The power transfer mechanism can have a multi-joint link structure, and for example, the multi-joint link structure may include: a first link including a first end portion connected to an output end portion of the actuator, and a second link including a first end portion rotatably connected to a second end portion of the first link, and a second end portion rotatably connected to the second flap pin.

As described above, the power transfer mechanism may be provided with the multi-joint link structure, transferring power to the first flap pin so that a linear operation and a rotation operation of the at least one flap may be performed through the one-time rotation driving of the actuator.

The aforementioned multi-joint link structure may be provided on first and second side surfaces of the housing in the width direction of the vehicle, respectively, and the active air flap system can further include: a driveshaft extending in the width direction of the vehicle and connecting a pair of the first links.

The driveshaft may be provided to equally transfer the power to the first links on both end portions of the at least one flap. Therefore, it is possible to solve the problem in that the at least one flap is distorted by transferring the unequal power in an opening or closing process of the at least one flap.

A plurality of flaps may be provided, and the power transfer mechanism may be provided for each of the flaps.

Therefore, it is possible to increase the air amount introduced through the active air flap, and to precisely control the amount of air drawn in by separately adjusting the opening or closing of the plurality of flaps.

The at least one flap may further include: a sealing member formed along an edge portion of the protrusion.

Therefore, it is possible to reliably seal between the at least one flap and the grill even when the gap is caused by a processing error between the at least one flap and the vents of the grill.

The at least one flap of the active air flap system may be configured so that a front surface of the protrusion is positioned on a same surface as the external surface in a state of covering the vents of the external surface in the predetermined portion of the vehicle.

Therefore, it is possible to construct a continuous skin line on the predetermined portion of the vehicle without step between the at least one flap and the grill that visually gives heterogeneity, improving the aesthetic sense. Furthermore, it is possible to suppress the occurrence of a high-pressure region caused by the flow being stagnant in the corresponding region due to the existence of the step, improving the aerodynamic performance.

At least one of the first guide hole and the second guide hole may be formed in the housing so that the rear end portion of the at least one in the front and rear direction of the vehicle is open, and a cover configured to cover an open end portion of the opened guide hole of the first guide hole and the second guide hole may be provided in the housing.

According to the above structure, first, it is possible to allow the first flap pin and the second flap pin to be maintained in the first guide hole and the second guide hole, respectively, in a simple method of pushing and inserting the first flap pin and the second flap pin through the open end portions of the first guide hole and the second guide hole and covering them with the cover, improving assemblability. Furthermore, it is possible to cover the rear surface of the housing using the cover, suppressing foreign substances from flowing into the multi-joint link and the guide holes.

At least one of the first guide hole and the second guide hole can extend from the housing to the cover.

According to the above structure, it is possible to reduce the size of the system in the width direction of the vehicle to achieve the dual operation even when the cover is provided, realizing the compactness of the system.

The active air flap system can further include: a stopper configured to regulate a rotation range of the first link, and the stopper may include a guide hole concavely formed in the housing, and a guide pin formed to protrude from the first link, and inserted into the guide hole to selectively contact with first and second end portions of the guide hole when the first link rotates to regulate rotation movement of the first link.

According to the above structure, it is possible to prevent the at least one flap from moving more than necessary even when a driving force of a certain size or a certain time or more is applied to the first link from the actuator.

The housing can further include: a mounting hole in which the driveshaft is mounted, and can have the second guide hole, the first guide hole, and the mounting hole sequentially provided therein in a predetermined direction, when viewing the housing from a side thereof.

According to the above structure, it is possible to stably support the driveshaft, solving the distortion problem of the at least one flap more reliably. Furthermore, it is possible to shorten the length of the power transfer path by disposing the second guide hole, the first guide hole, and the mounting hole in the above order, further compacting the size of the system.

The active air flap system can further include: a control unit configured to control the actuator, in which the control unit can receive a signal related to at least one of a vehicle speed, an outside air temperature, a refrigerant pressure, and a coolant temperature from a sensor 80 mounted on the vehicle, and control the degree of opening or closing of the at least one flap based on the input signal.

According to the above structure, it is possible to determine preferential performance of aerodynamic performance and cooling performance based on a traveling state of the vehicle, an outside air temperature, etc., and to effectively control the at least one flap according to the determination result.

According to the active air flap system for the vehicle according to an exemplary embodiment of the present disclosure, because the gap does not exist between the at least one flap and the vents of the grill in the state where the at least one flap is closed, it is possible to additionally improve the aerodynamic performance by 20 to 30% or more compared to the conventional active air flap system.

Furthermore, according to the active air flap system for the vehicle according to an exemplary embodiment of the present disclosure, it is not necessary to provide the gap to prevent the operational interference between the at least one flap and the vents of the grill in the state where the at least one flap is closed. Therefore, it is possible to bring the at least one flap into close contact with the grill so that the surface of the at least one flap is formed on the same surface as the surface of the grill. Therefore, it is possible to construct the continuous skin line on front portion of the vehicle without the step that visually gives heterogeneity, improving the aesthetic sense.

Furthermore, the active air flap system for the vehicle according to an exemplary embodiment of the present disclosure continuously performs the dual operation of the operation of linearly moving the at least one flap and the operation of rotating the at least one flap in the fixed position. Therefore, it is possible to actively control the air amount by appropriately selecting the operation mode of the at least one flap and the amount of movement of the at least one flap in the operation mode depending upon the outside air temperature, the vehicle speed, etc. Therefore, it is possible to implement the optimal opening/closing mode configured for simultaneously satisfying the aerodynamic performance and the cooling performance.

Furthermore, according to the active air flap system for the vehicle according to an exemplary embodiment of the present disclosure, to implement the aforementioned effect, it is possible to implement the plurality of operations of the at least one flap using one actuator without the additional driving source, reducing the manufacturing cost.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
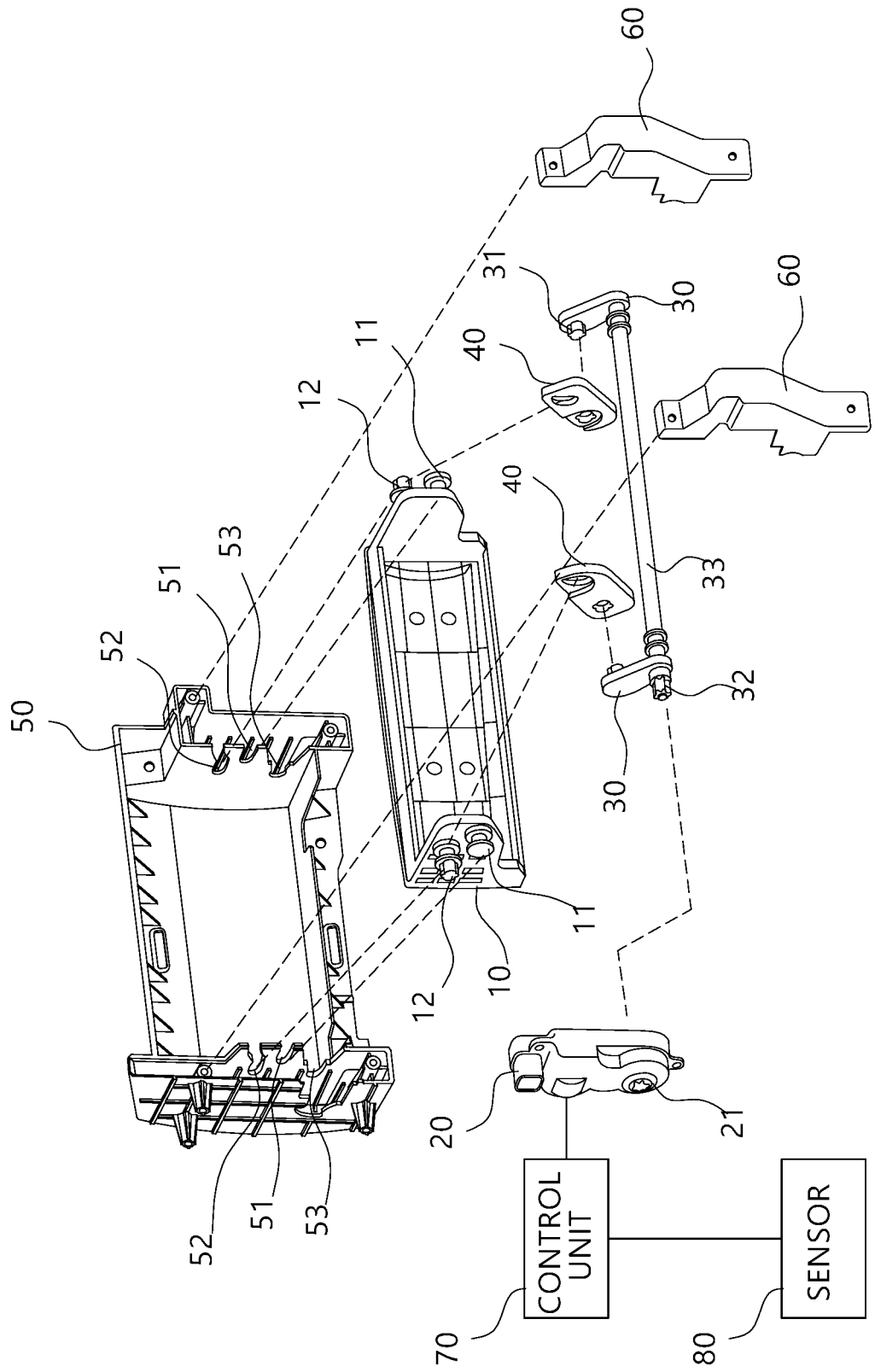
FIG. 1 is an exploded perspective diagram of an active air flap system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, some exemplary embodiments of the present disclosure will be described in detail with reference to exemplary drawings. In adding reference numerals to the components of each drawing, it should be noted that the same components are denoted by the same reference numerals as much as possible even though they are shown in different drawings. Furthermore, in describing the exemplary embodiment of the present disclosure, if it is determined that a detailed description of a related known configuration or function interferes with the understanding of the exemplary embodiment of the present disclosure, a detailed description thereof will be omitted. In the present process, the thicknesses of the lines, the sizes of the components, etc. shown in the drawings may be exaggeratively shown for clarity and convenience of explanation. Furthermore, the terms to be described later are terms defined in consideration of functions in the present disclosure, which can vary according to intentions or customs of users and operators. Therefore, definitions of these terms should be made based on the content throughout the present specification.

Figure 2:
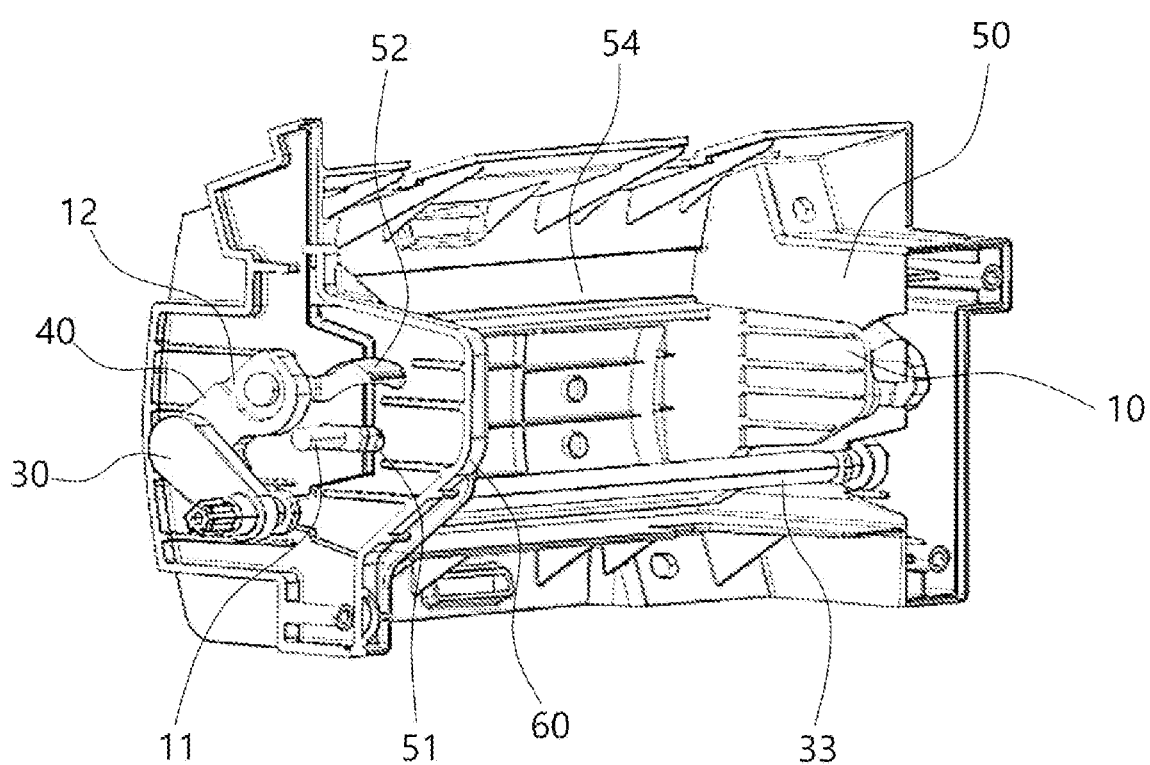
FIG. 2 is a perspective diagram showing a rear side surface of the active air flap system according to the exemplary embodiment of the present disclosure.
Figure 3:
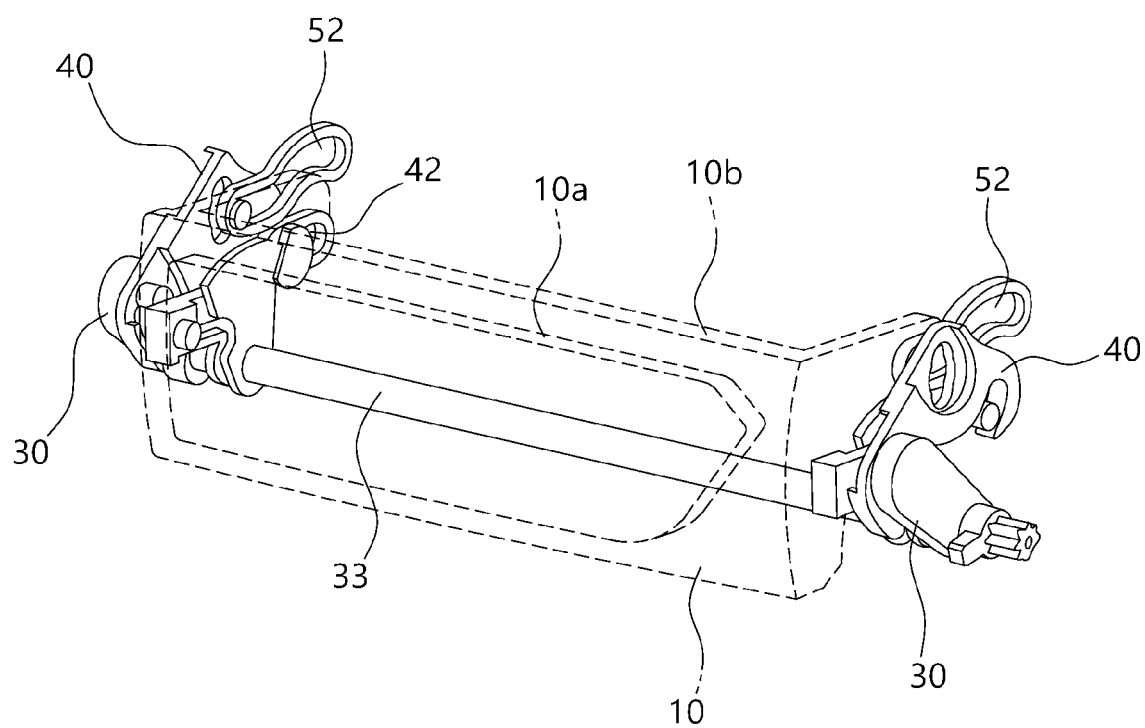
FIG. 3 is a perspective diagram showing a front side surface of the active air flap system according to the exemplary embodiment of the present disclosure.
Figure 5:
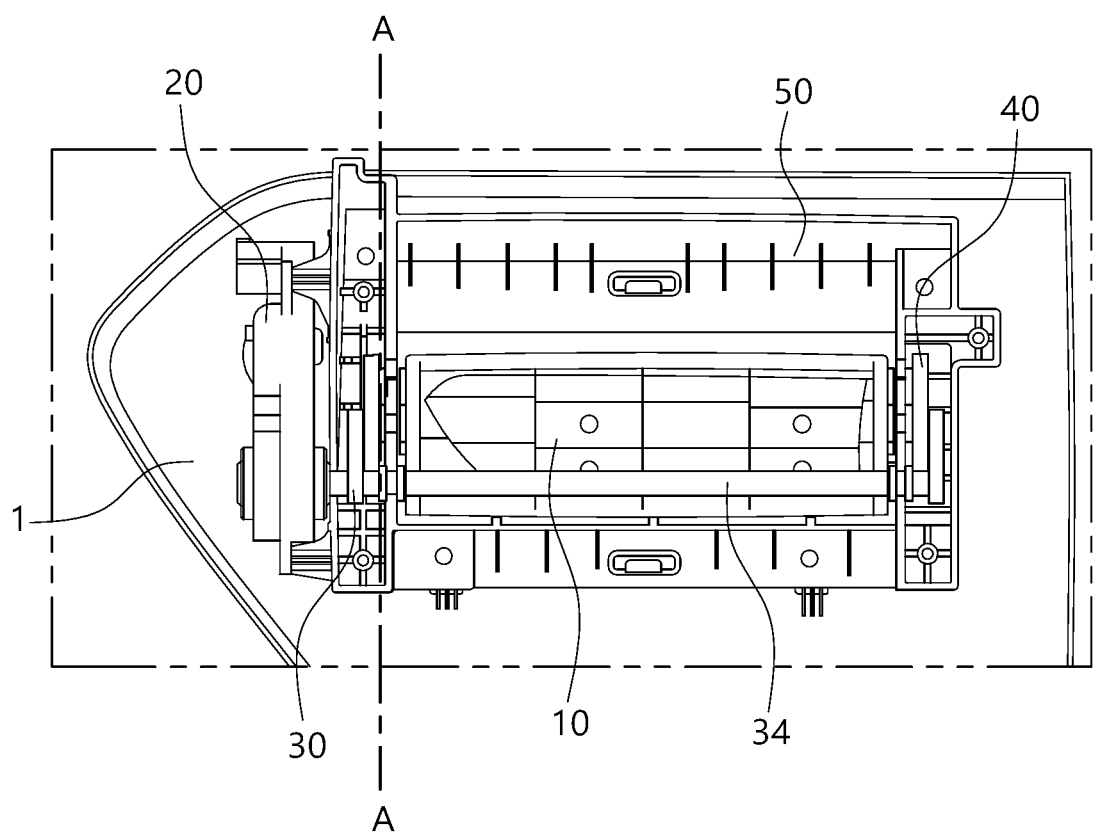
FIG. 5 is a rear diagram of the grill provided in the active air flap system according to the exemplary embodiment of the present disclosure.

FIG. 1 is an exploded perspective diagram of an active air flap system according to an exemplary embodiment of the present disclosure, FIG. 2 is a perspective diagram showing a rear side surface of the active air flap system according to the exemplary embodiment of the present disclosure, FIG. 3 is a perspective diagram of a front side surface that omits a housing from the active air flap according to the exemplary embodiment of the present disclosure, and FIG. 5 is a rear diagram of the grill provided in the active air flap system according to the exemplary embodiment of the present disclosure.

Referring to FIG. 1, FIG. 2, and FIG. 3, an active air flap system according to an exemplary embodiment of the present disclosure includes: a housing 50, a flap 10, an actuator 20, and power transfer mechanisms 30, 40 configured to transfer power from the actuator 20 to at least one flap 10.

As shown in FIG. 5, the housing 50 may be mounted on a rear surface of the grill 1 such as a radiator grill mounted on a front portion of a vehicle. Alternatively, the housing 50 can also be mounted on a rear surface of a front bumper in which vents are formed. The housing 50 is configured to support the at least one flap 10 to be described later as well as to form a space for guiding the outside air passing through the vents 1b of the grill 1 or the front bumper to a space in the front portion of the vehicle.

The housing 50 includes a front portion including an opening 54 passing therethrough to form an opening, and sidewall portions extending from both edge portions of the front portion in a width direction of the vehicle to the rear side in the front and rear direction of the vehicle, respectively. As shown in FIG. 5, the front portion of the housing 50 is mounted on the rear surface of the grill 1, and at the instant time, the opening 54 is configured to fluidically communicate with ventilation holes of the grill 1. Here, the grill 1 is an example of an external surface of the vehicle, and in addition to the grill 1, the opening 54 can also fluidically communicate with ventilation holes of a bumper in which the ventilation holes are formed.

Figure 4:
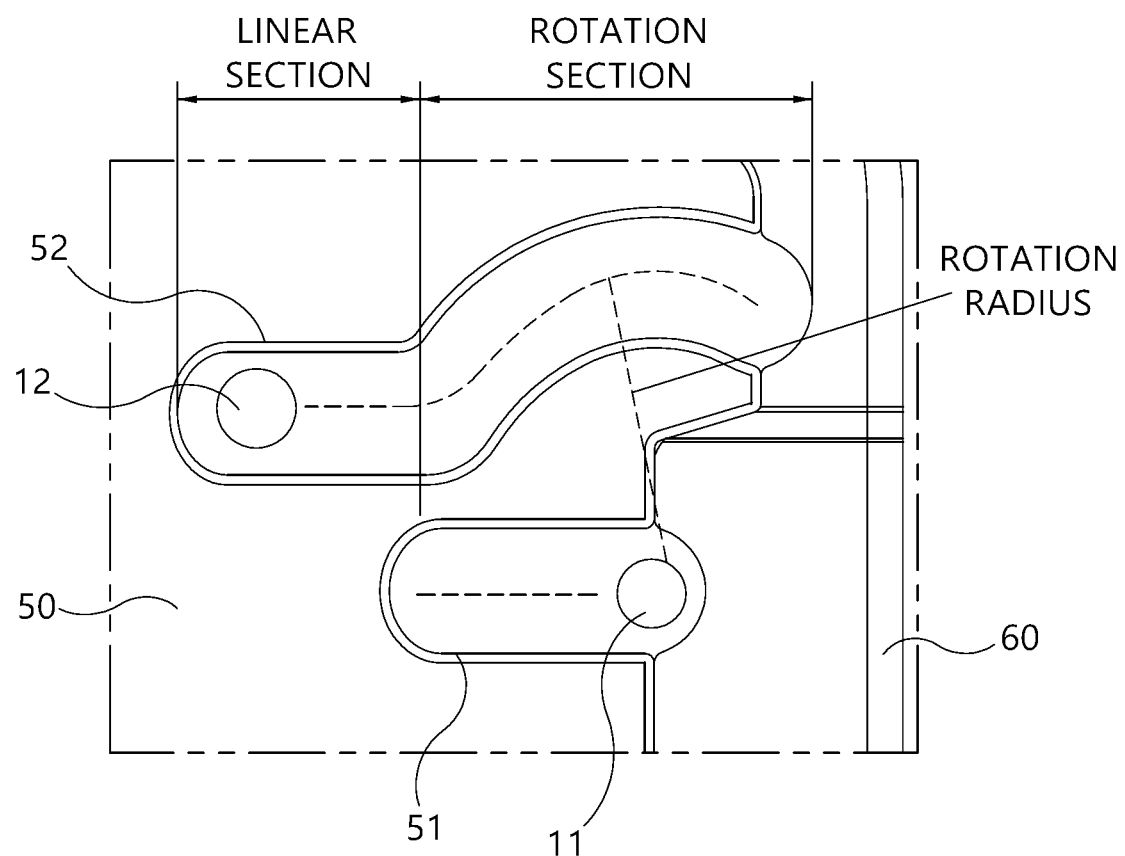
FIG. 4 is a diagram showing first and second guide holes provided in the active air flap system according to the exemplary embodiment of the present disclosure and first and second flap pins moving along the first and second guide holes.

FIG. 4 shows a first guide hole 51 and a second guide hole 52 provided in the housing 50 of the active air flap system according to the exemplary embodiment of the present disclosure.

The first guide hole 51 and the second guide hole 52 are formed to pass through both sidewalls of the housing 50. The first guide hole 51 linearly extends in the front and rear direction of the vehicle when viewed from the side thereof. The second guide hole 52 is provided in parallel with the first guide hole 51 in a first direction (upward in a vertical direction in the drawing), and has a linear section extending in the same direction as that of the first guide hole 51 and a rotation section which is continuous from the linear section and has an arc shape when viewed from the side thereof.

The at least one flap 10 is mounted to the housing 50 to be relatively movable. The at least one flap 10 is configured to adjust the amount of air introduced into the front of the vehicle through the opening 54 by opening or closing the vents 1b of the grill 1 fluidically-communicating with the opening 54 of the housing 50. For example, the at least one flap 10 closes the vents 1b of the grill 1 fluidically-communicating with the opening 54 of the housing 50 when the vehicle travels at high speed to lower an air resistance, whereas opening the vents 1b of the grill 1 fluidically-communicating with the opening 54 of the housing 50 when it is necessary to increase the cooling efficiency of an internal combustion engine, an electric motor, a heat exchanger, etc. stored in the front of the vehicle.

Like the housing 50, the at least one flap 10 includes a front portion and sidewall portions extending from both edge portions of the front portion in the width direction of the vehicle to the rear side in the front and rear direction of the vehicle, respectively. The front portion of the at least one flap 10 opens or closes the vents 1b of the grill 1 fluidically-communicating with the opening 54 of the housing 50. The sidewall portions of the at least one flap 10 are maintained to be relatively movable to the corresponding sidewall portions of the housing 50. In an example shown in FIG. 2, an area of the front portion of the at least one flap 10 is disclosed to be smaller than an area of the opening 54 of the housing 50, but the present disclosure is not limited thereto. The area of the front portion of the at least one flap 10 may be the same as the area of the opening 54 of the housing 50 as long as the vents 1b of the grill 1 may be opened or closed by the front portion of the at least one flap 10. In an exemplary embodiment of the present invention, the area of the front portion of the at least one flap 10 is smaller than the area of the opening 54 of the housing 50 so that the at least one flap 10 smoothly operates within the housing 50.

Figure 10A:
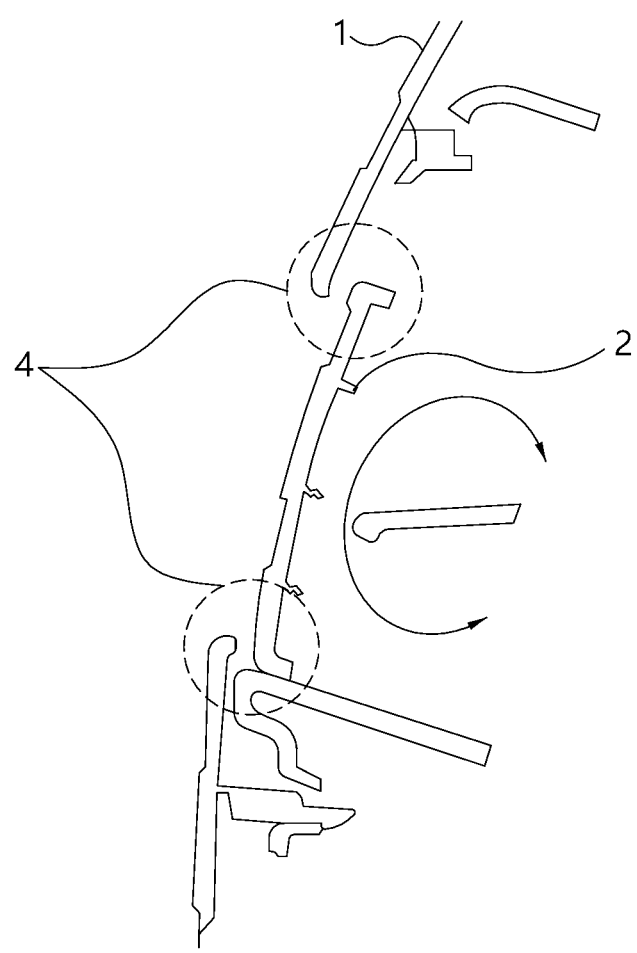
FIG. 10A is a cross-sectional diagram of a front portion of a vehicle provided with a conventional active air flap system.
Figure 10B:
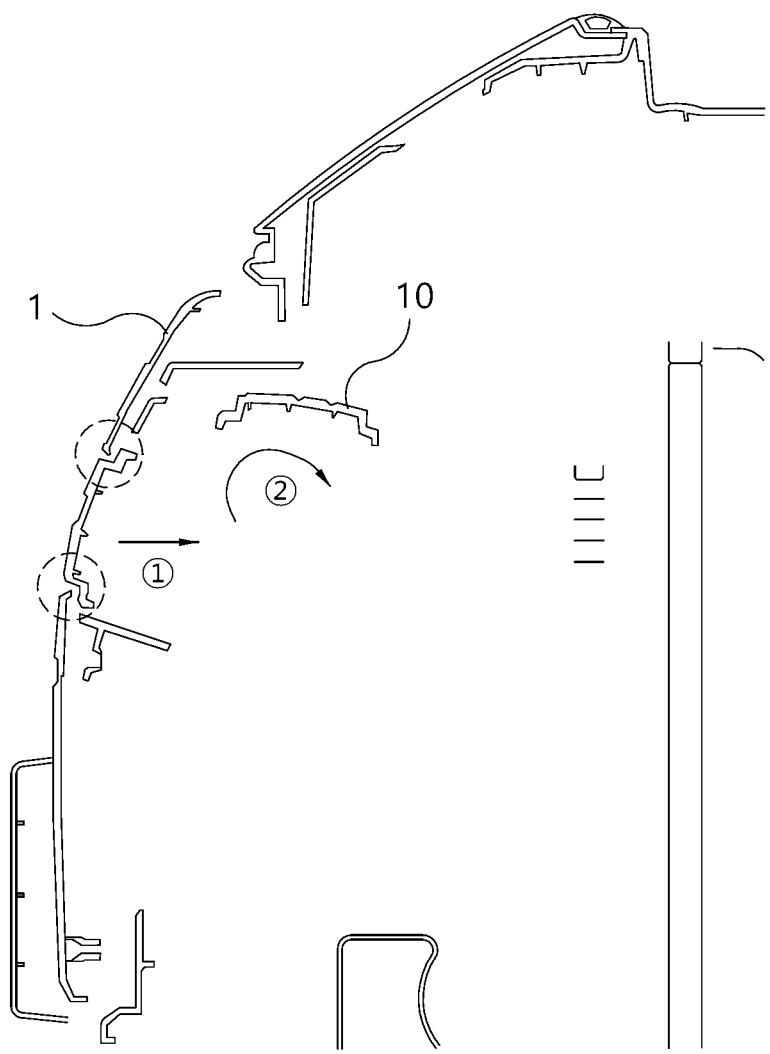
FIG. 10B is a cross-sectional diagram of the front portion of the vehicle provided with the active air flap system according to the exemplary embodiment of the present disclosure.
Figure 11:
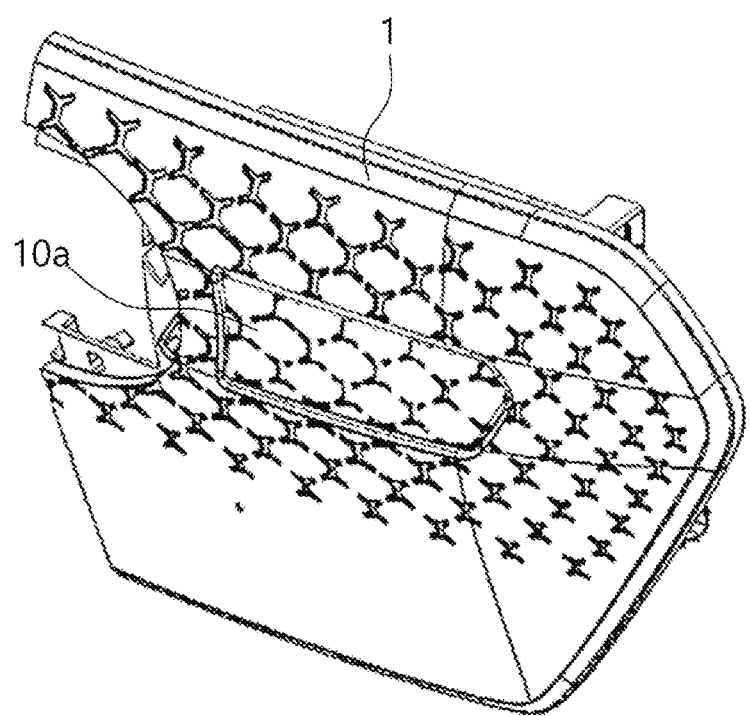
FIG. 11 is a perspective diagram showing a front side surface of a grill provided in the active air flap system according to the exemplary embodiment of the present disclosure.
Figure 12A:
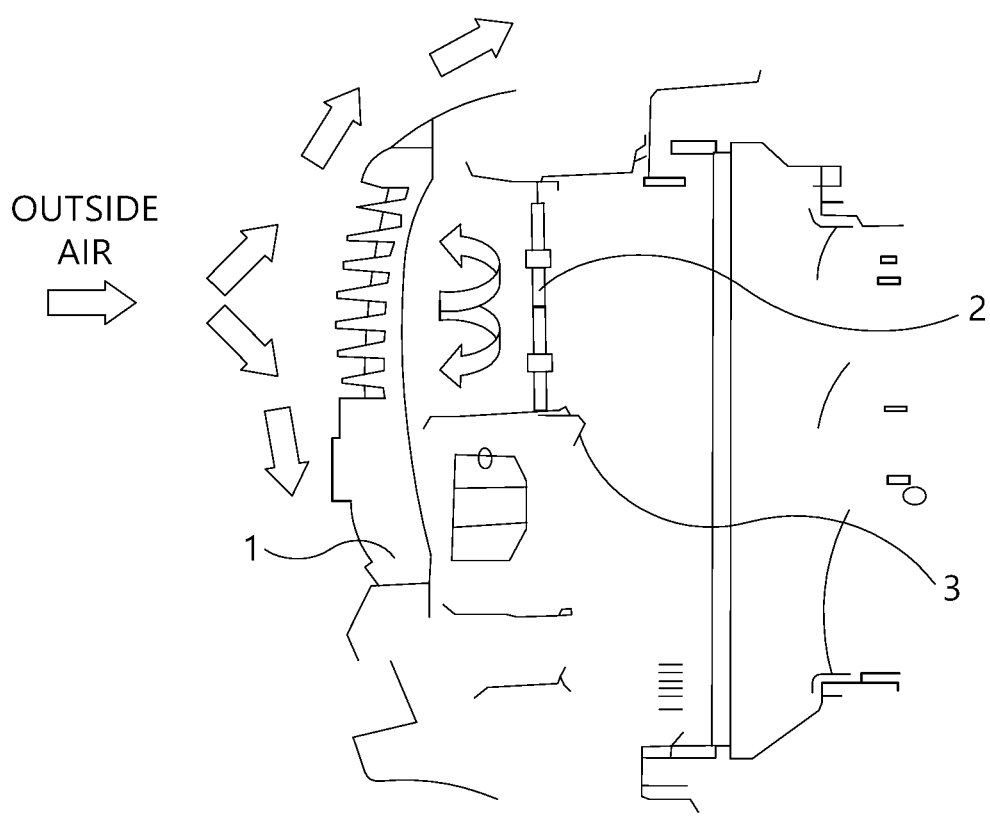
FIG. 12A and FIG. 12B are diagrams for explaining a flap driving method using the conventional active air flap system.
Figure 12B:
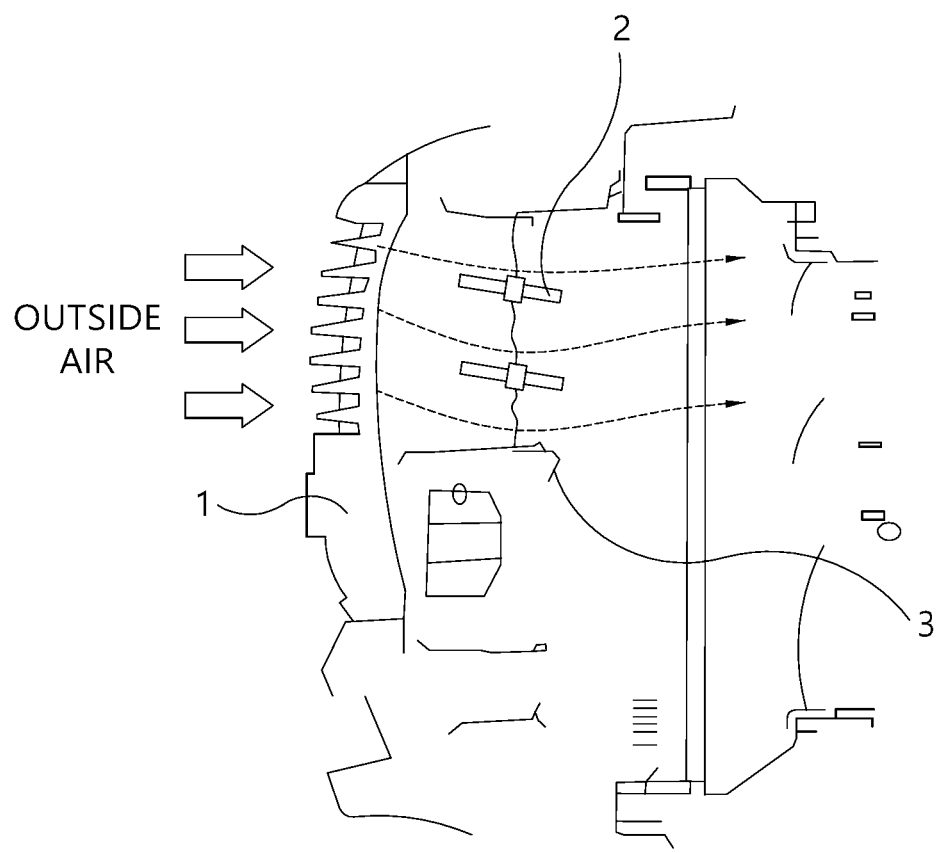

As shown in FIG. 3, the front portion of the at least one flap 10 is provided with a protrusion 10a protruding forward in the front and rear direction of the vehicle. The shape and dimension of the protrusion 10a when viewed from the front are the same as the shape and dimension of the vents 1b of the grill 1. Furthermore, as shown in FIG. 10B, when the vehicle is viewed from the side in a state where the at least one flap 10 closes the vents 1b of the grill 1, a protrusion depth of the protrusion 10a is set so that the front surface of the protrusion 10a is positioned on the same surface as the external surface of the grill 1. In the instant case, as shown in FIGS. 10B and 11, in the state where the at least one flap 10 is closed, a gap is not formed between the at least one flap 10 and the vent 1b of the grill 1 and the vents 1b may be completely closed. Furthermore, the grill 1 and the at least one flap 10 can form the same skin line without forming a step, improving the aesthetic sense.

Furthermore, as shown in FIG. 3, a sealing member 10*b* is provided along the edge portion of the protrusion 10*a*. The sealing member 10*b* can be made of any one selected from a resin-based material and a hard rubber material. As described above, the shape and size of the protrusion 10*a* when viewed from the front are the same as the shape and size of the vents 1*b* of the grill 1. However, the gap may be formed between the protrusion 10*a* of the at least one flap 10 and the vents 1*b* of the grill 1 due to a processing error, and the outside air may be leaked through the present gap and introduced. Therefore, the sealing member 10*b* is configured to seal the vents 1*b* of the grill 1 when the at least one flap 10 is closed to prevent the air from being introduced through the space formed by the processing error, etc. between the protrusion of the at least one flap 10 and the vents 1*b* of the grill 1.

A first flap pin 11 and a second flap pin 12 are formed to protrude from the external surfaces of the sidewalls of the at least one flap 10 in the width direction of the vehicle, respectively.

As shown in FIG. 4, the second flap pin 12 is inserted into the second guide hole 52 of the housing 50. The first flap pin 11 is provided below the second flap pin 12 and inserted into the first guide hole 51 of the housing 50. Therefore, when the at least one flap 10 is moved by receiving power generated by the actuator 20 and the power transfer mechanisms 30, 40, first, the second flap pin 12 slides and moves along the linear section of the second guide hole 52 and the first flap pin 11 slides and moves along the first guide hole 51 in the integral manner. Therefore, the at least one flap 2 integrally formed with the first flap pin 11 and the second flap pin 12 also slides and moves in the front and rear direction of the vehicle. Furthermore, when the first flap pin 11 reaches the rear end portion of the first guide hole 51 in the front and rear direction of the vehicle, the first flap pin 11 stops sliding movement at the corresponding position. At the instant time, when the first and second flap pins 11, 12 continue to receive a force transferred through the actuator 20 and the power transfer mechanisms 30, 40, the second flap pin 12 enters the rotation section with the arc shape of the second guide hole 52 and the first flap pin 11 rotates in a fixed position, and the second flap pin 12 moves along the rotation section in a predetermined rotation radius around the first flap pin 11. Therefore, the at least one flap 2 integrally formed with the first flap pin 11 and the second flap pin 12 also rotates.

To smoothly perform the aforementioned operation, when viewed from the side, the first guide hole 51 is provided on the rear of the vehicle in the front and rear direction than the second guide hole 52, and the linear section of the second guide hole 52 is configured to be the same as the total length of the first guide hole 51.

A plurality of flaps 10 may be provided, and when one housing 50 includes a plurality of openings 54, one flap 10 may be provided for each opening 54. In the instant case, the power transfer mechanisms 30, 40 may be provided for each flap 10 to transfer power from the actuator 20 to each of the flaps 10.

The actuator 20 is configured to generate a driving force for driving the at least one flap 10. The actuator 20 can be an electric motor configured to rotate an output end 21 by receiving power from the vehicle, or can also be a hydraulic mechanism configured to rotate the output end 21 by receiving hydraulic pressure from a hydraulic supply device of the vehicle. If a plurality of flaps 10 are provided, a plurality of actuators 20 may be provided for each flap 10, but when manufacturing cost is considered, the power from one actuator 20 is supplied to a plurality of power transfer mechanisms so that a power transfer path is branched using a gear, etc.

The power transfer mechanisms 30, 40 are configured to transfer the rotation power generated by the actuator 20 to the at least one flap 10. The power transfer mechanisms 30, 40 can have a multi-joint link structure in which a plurality of links are connected to each other so that the at least one flap 10 receives a force in a predetermined direction using the rotation power generated by the actuator 20.

In the example shown in FIG. 1 and FIG. 2, the power transfer mechanisms 30, 40 include a first link 30 and a second link 40. The first link 30 is configured so that an input end portion 32 formed to protrude from one end portion in a longitudinal direction of the first link 30 is engaged with the output end 21 of the actuator 20. Furthermore, a connection end 31 provided to protrude from the other end portion of the first link 30 is rotatably connected to a hole formed in one end portion of the second link 30 in the longitudinal direction. The second flap pin 12 is rotatably connected to a hole formed in the other end portion of the second link 30 in the longitudinal direction. In other words, the first link 30 is a loader, and the second link 40 is a linkage.

When the output end 21 of the actuator 20 rotates, the first link 30 rotates around the input end portion 32 engaged with the output end 21. Furthermore, therefore, the second link 40 rotatably connected to the first link 30 moves and applies a force to the second flap pin 12. As a result, the second flap pin 12 and the first flap pin 11 integrally formed with the second flap pin 12 move in the aforementioned form along the second guide hole 52 and the first guide hole 51, respectively.

Preferably, two first links 30 may be connected by a driveshaft 33 extending in the width direction of the vehicle. If the first link 30 is provided on both side surfaces of the housing 50, respectively, there can occur a case where the operation is not smoothly performed by left and right distortion during operation of the at least one flap 20 when the power from the actuator 20 is directly transferred only to the first link 30 provided on one side surface thereof. In the instant case, when the first link 30 directly connected to the actuator 20 is directly connected to the other first link 30 through the driveshaft 33, the driving force may be equally transferred to the left and right sides of the at least one flap 20, preventing the above distortion problem.

Furthermore, both end portions of the driveshaft 33 are configured to be mounted in the mounting holes 53 formed in each of the left and right sidewalls of the housing 50. In the instant case, it is possible to stably support the driveshaft 33, eliminating the above distortion problem more reliably.

Figure 6:
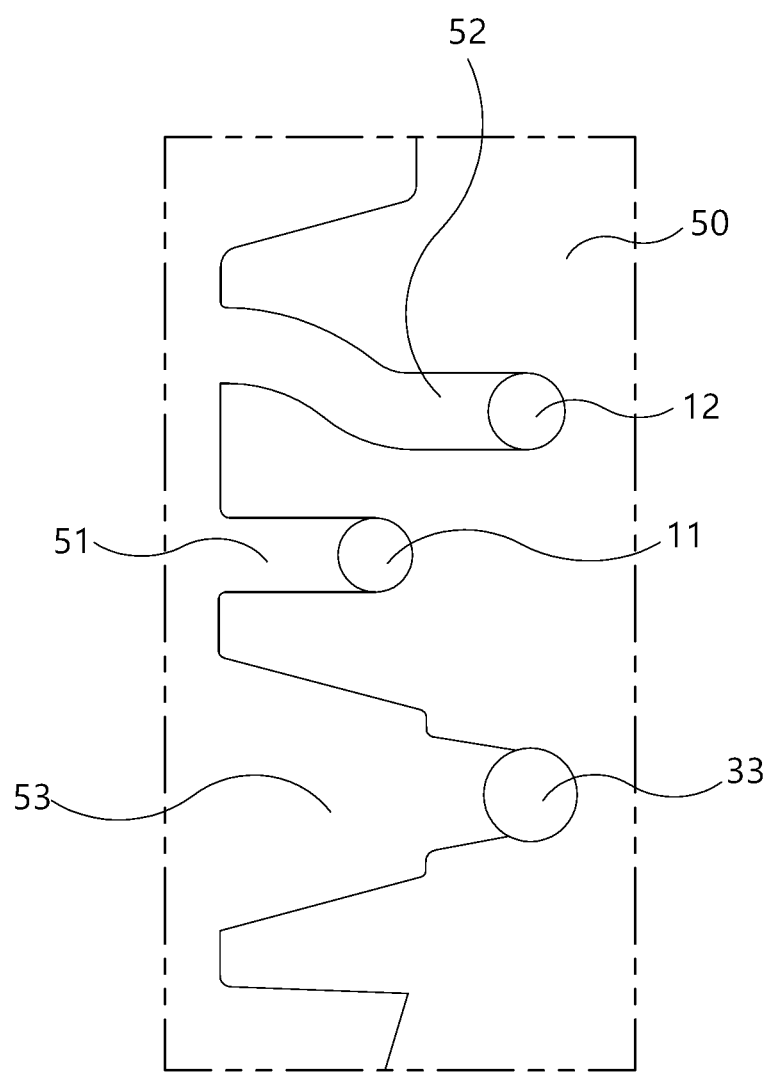
FIG. 6 is a diagram for explaining an arrangement structure of the first and second guide holes and mounting holes provided in a housing of the active air flap system according to the exemplary embodiment of the present disclosure.

FIG. 6 is a cross-sectional diagram showing the active air flap system shown in FIG. 5 taken along the plane A-A. As shown in FIG. 6, the second guide hole 52, the first guide hole 51, and the mounting hole 53 are formed on the sidewall of the housing 50 in a predetermined direction (vertically in the drawing) in the above order. In the instant case, it is possible to shorten a length of the power transfer path, further compacting the size of the system.

The active air flap system according to an exemplary embodiment of the present disclosure is provided with a cover 60. In the instant case, as shown in FIG. 1, at least one of the first guide hole 51 and the second guide hole 52 provided in the housing 50 has an open end portion with an open rear end portion in the front and rear direction of the vehicle. The cover 60 is configured to cover the open end portion to use it as a closed end portion.

Unless the sidewall of the housing 50 in which the first guide hole 51 and the second guide hole 52 are formed, and the sidewall of the at least one flap 10 in which the first flap pin 11 and the second flap pin 12 are formed are not formed of a high elastic member, it is not easy to insert the first flap pin 11 and the second flap pin 12 into the first guide hole 51 and the second guide hole 52 formed in both sidewalls thereof. However, according to the above structure, first, when the first flap pin 11 and the second flap pin 12 are pushed and inserted through the open end portions of the first guide hole 51 and the second guide hole 52 and then covered by the cover 60, the first flap pin 11 and the second flap pin 12 may be maintained to the first guide hole 51 and the second guide hole 52, respectively, in a simple method. Two covers 60 may be provided so that one is formed on each of both sidewalls of the housing 50, and fixed to the housing 50 using screws, etc.

Figure 7:
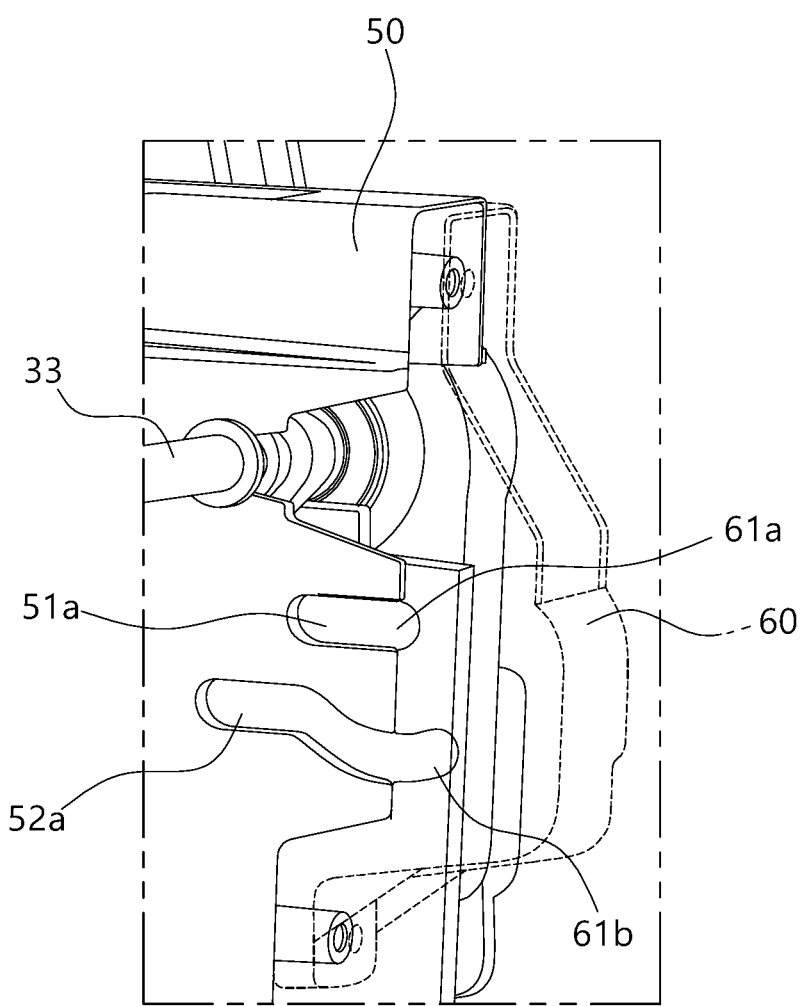
FIG. 7 is a partially enlarged diagram of a cover portion of the active air flap system according to the exemplary embodiment of the present disclosure.

Meanwhile, as shown in FIG. 7, at least one of the first guide hole 51 and the second guide hole 52 can extend from the housing 50 to the cover 60. In other words, portions 61a, 61b of the first guide hole 51 and the second guide hole 52 can also be formed in the cover 60. In the instant case, even when the cover 60 is added to the housing 50, it is possible to suppress an increase in the width direction dimension of the system, compacting the size of the system as a whole.

Figure 8A:
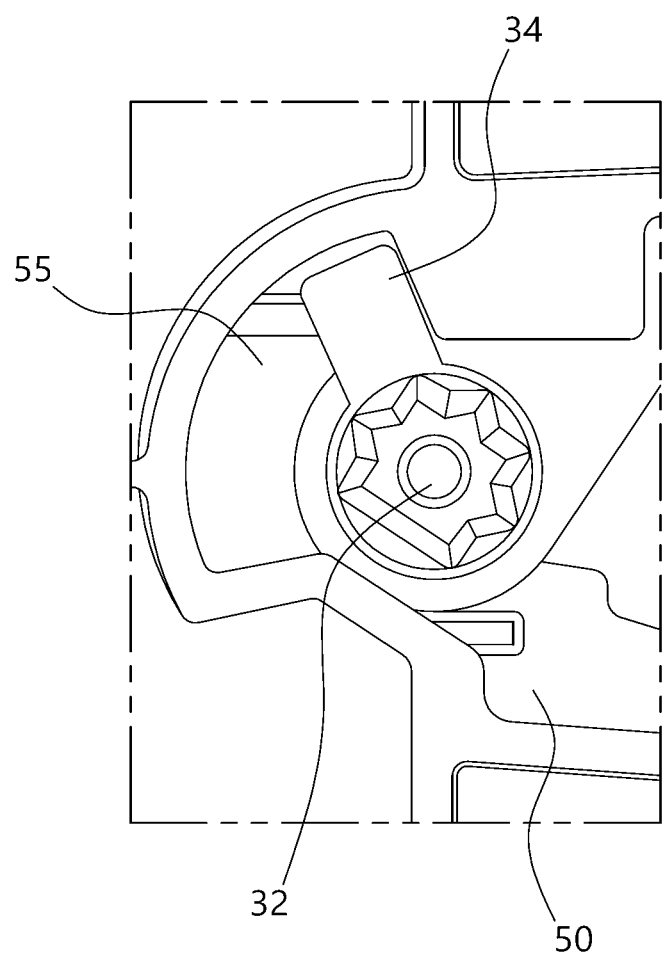
FIG. 8A and FIG. 8B are partially enlarged diagrams of a stopper of the active air flap system according to the exemplary embodiment of the present disclosure.
Figure 8B:
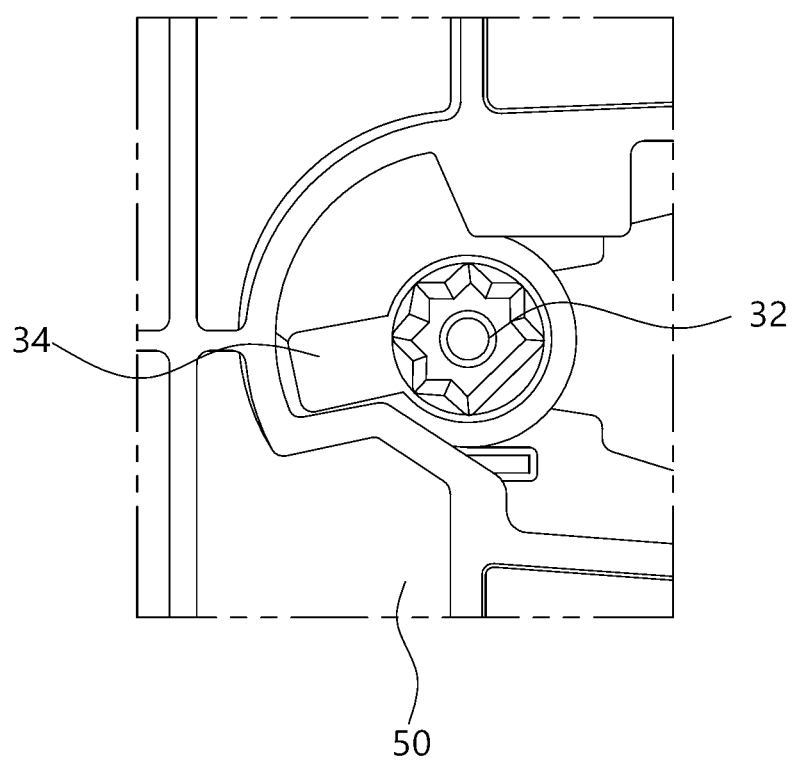

Furthermore, as shown in FIGS. 8A and 8B, the active air flap system according to an exemplary embodiment of the present disclosure can further include a stopper configured for regulating a rotation range of the first link 30. In the example shown in FIGS. 8A and 8B, the stopper may include a guide hole 55 concavely formed in a thickness direction of the housing 50, and a guide pin 34 inserted into the guide hole 55 to be selectively in contact with both ends of the guide hole 55 when the first link 30 rotates to regulate the rotation movement of the first link 30. The guide pin 34 has a pin shape protruding from the input end portion 32 of the first link 30 in the front and rear direction of the vehicle. According to the above structure, when the first link 30 rotates by a certain angle or more in a clockwise direction (FIG. 8A) and when the first link 30 rotates by a certain angle or more in a counterclockwise direction (FIG. 8B), the guide pin 34 collides with each of sidewall portions forming the guide hole 55. Therefore, it is possible to limit the rotation range of the first link 30. According to the above structure, even when a driving force of a certain size or a certain time or more is applied to the first link 30 from the actuator 20, it is possible to prevent the at least one flap 10 from moving more than necessary.

Furthermore, the active air flap system according to an exemplary embodiment of the present disclosure can further include a control unit 70 configured to control the actuator 20. Here, the control unit 70 is configured to receive a signal related to at least one of a vehicle speed, an outside air temperature, a refrigerant pressure, and a coolant temperature from a sensor 80 mounted on the vehicle, and transmits a predetermined duty signal to the actuator 20 to control the degree of opening or closing of the at least one flap based on the input signal. For example, when the vehicle speed exceeds a predetermined vehicle speed, the control unit 70 is configured to control the actuator 20 in a direction in which the at least one flap 10 is closed to secure aerodynamic performance. Furthermore, when the coolant temperature is higher than a predetermined degree, the control unit 70 is configured to control the actuator 20 in a direction in which the at least one flap 10 is opened to rapidly cool the internal combustion engine or the motor provided in the vehicle. Furthermore, the control unit 70 can also control the actuator 20 according to the result of combining the respective variables by weighing the respective variables affecting aerodynamic performance and cooling performance.

The control unit 70 may be implemented in a form of a computer provided in the vehicle. In the instant case, it is possible to realize the control function by recording the program for realizing the present control function on a computer-readable recording medium, and reading and executing the program recorded on the recording medium into a computer system. Furthermore, the computer system described herein is a computer system embedded in the vehicle, and includes hardware such as an OS and peripheral devices. Furthermore, the computer-readable recording medium refers to a portable medium such as a flexible disk, a magneto-optical disk, a ROM, or a CD-ROM, and a storage device such as a hard disk embedded in the computer system. Furthermore, the computer-readable recording medium includes maintaining the program shortly and dynamically like a communication line in a case of transmitting the program through a network such as the Internet or a communication line such as a phone line, or maintaining the program for a certain time such as a volatile memory in the computer system which is a server or a client in that case. Furthermore, the program may be to realize a portion of the aforementioned functions, and can also be the one that can realize the aforementioned functions in combination with the program already recorded in the computer system.

Hereinafter, a specific operation aspect of the active air flap according to the exemplary embodiment of the present disclosure will be described with reference to FIG. 9A, FIG. 9B and FIG. 9C.

Figure 9A:
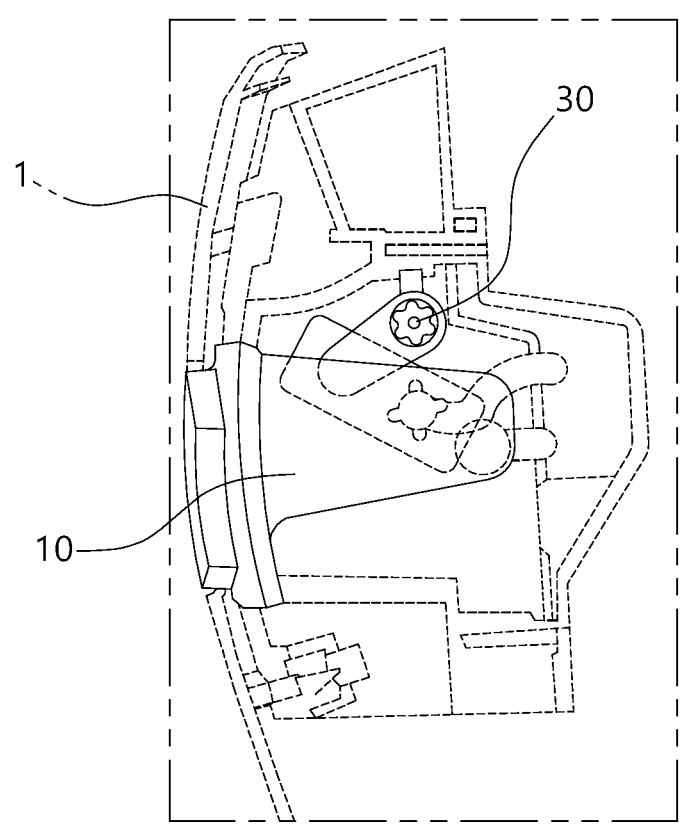
FIG. 9A, FIG. 9B and FIG. 9C are diagrams for explaining a flap driving method using the active air flap system according to the exemplary embodiment of the present disclosure.
Figure 9B:
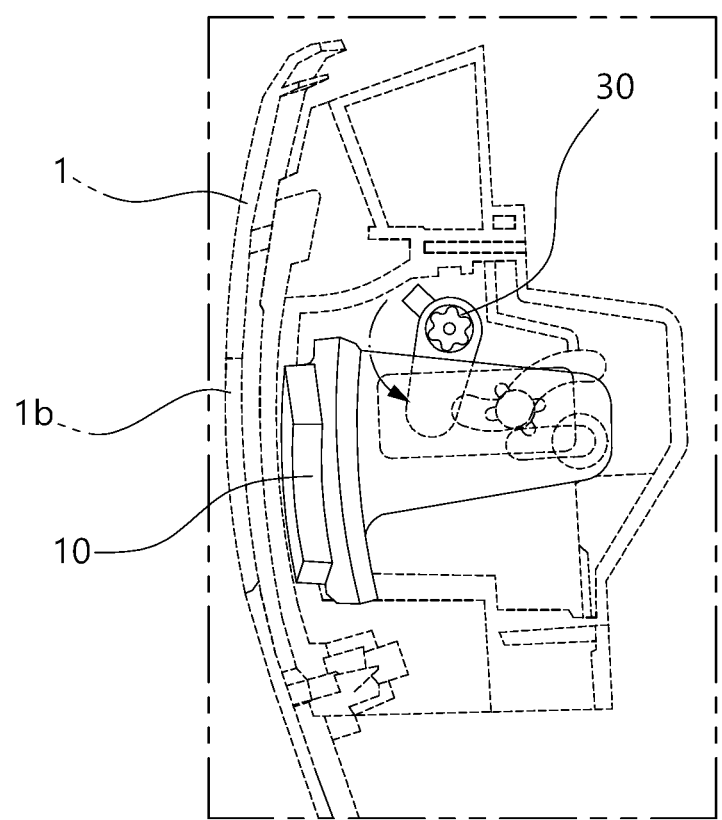
Figure 9C:
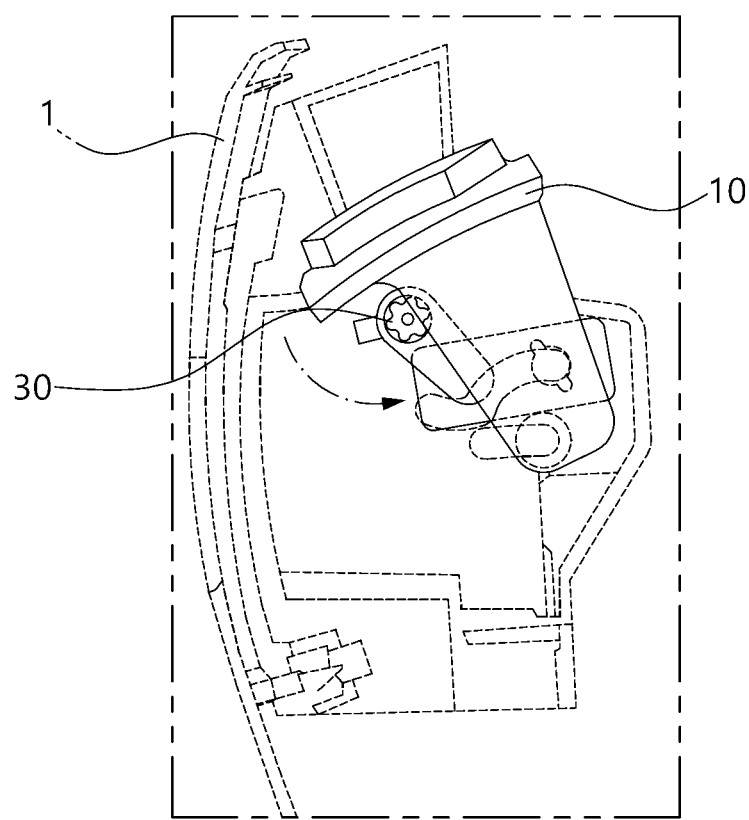

FIG. 9A shows a state where the introduction of the air is blocked by closing the vents 1b of the grill 1 by the at least one flap 10. Because the above state is a state where the vents 1b are completely sealed by the protrusion 10a and the sealing member 10b of the at least one flap 10, there is no gap through which air flows between the at least one flap 10 and the vents 1b. Furthermore, as shown in FIG. 9A, the at least one flap 10 protrudes to the outside so that the front surface of the protrusion 10a of the at least one flap 10 is continuous without step with the external surface of the grill 1.

When the actuator 20 is operated in the instant state, the first link 30 rotates around the input end portion 31. Furthermore, the second link 40 rotatably connected to the first link 30 moves and applies a force to the second flap pin 12. As a result, the second flap pin 12 and the first flap pin 11 integrally formed with the second flap pin 12 slide and move along the linear section of the second guide hole 52 and the first guide hole 51. As a result, as shown in FIG. 9B, only the position of the at least one flap 10 is moved backward while the at least one flap 10 maintains the posture shown in FIG. 9A. Because the at least one flap 10 does not rotate in the instant state, there is no concern of being in contact with the vents 1b of the grill 1 in a process of operating the at least one flap 10. Therefore, it is not necessary to form the gap between the at least one flap 1 and the vents 1b.

In the present state, when the first and second flap pins 11, 12 continue to receive the force transferred through the actuator 20 and the power transmission mechanisms 30, 40, the first flap pin 11 is in contact with the end portion of the first guide hole 51 to stop the sliding movement, and the second flap pin 12 enters the rotation section with the arc shape of the second guide hole 52. Therefore, the first flap pin 11 rotates at the fixed position, and the second flap pin 12 moves along the predetermined rotation radius around the first flap pin 11. Therefore, as shown in FIG. 9C, the at least one flap 2 integrally formed with the first flap pin 11 and the second flap pin 12 also rotates.

In the present state, because the at least one flap 10 rotates at a position spaced from the vents 1b of the grill 1, the at least one flap 10 does not interfere with the vents 1b even when rotating. Furthermore, in the instant state in the instant state, because the front surface of the at least one flap 10 including the protrusion 10a rotates to face the upper surface, it is possible to secure a relatively wide area through which external air can pass in the housing 50 even by a compact device. Therefore, it is possible to secure the cooling performance more highly compared to the state shown in FIG. 9B.

By use of these characteristics, the control unit 70 can control the at least one flap 10 so that the at least one flap 10 is in any one of a linear movement mode and a rotation movement mode in consideration of a traveling state of the vehicle, the outside air temperature, the cooling state, etc., and control the amount of air introduced and the direction of the airflow more precisely by adjusting the sliding movement distance, rotation angle, etc. of the at least one flap 10 in each mode.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

The scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An active air flap system mounted in a predetermined portion of a vehicle, the active air flap system comprising:
   a housing;
   at least one flap mounted on the housing to be movable with respect to the housing;
   an actuator coupled to the at least one flap and configured to drive the at least one flap; and
   a power transfer mechanism engaging the actuator and the at least one flap and configured to transfer power from the actuator to the at least one flap so that the at least one flap performs a dual operation including a sliding operation and a rotation operation around a predetermined rotation axis,
   wherein the power transfer mechanism has a multi-joint link structure, and
   wherein the multi-joint link structure includes:
      a first link including a first end portion connected to an output end portion of the actuator,
      a second link including a first end portion rotatably connected to a second end portion of the first link, and a second end portion rotatably connected to a second flap pin, and
   wherein the multi-joint link structure is provided on first and second side surfaces of the housing in a width direction of the vehicle, respectively, and wherein the active air flap system further includes a driveshaft extending in the width direction of the vehicle and connecting a pair of first links.

2. The active air flap system of claim 1,
   wherein the at least one flap is configured so that the at least one flap covers vents formed on an external surface of the predetermined portion of the vehicle when the at least one flap moves in a direction, and
   wherein the at least one flap is provided with a protrusion having a shape corresponding to the vents.

3. The active air flap system of claim 2,
   wherein the at least one flap further includes a sealing member formed along an edge portion of the protrusion.

4. The active air flap system of claim 2,
   wherein the at least one flap of the active air flap system is configured so that a front surface of the protrusion is positioned on a same surface as the external surface in a state of covering the vents of the external surface in the predetermined portion of the vehicle.

5. The active air flap system of claim 1,
   wherein the at least one flap includes a first flap pin and the second flap pin provided on at least one side in the width direction of the vehicle, respectively, and
   wherein the housing includes:
      a first guide hole into which the first flap pin is coupled and extending in a front and rear direction of the vehicle; and
      a second guide hole into which the second flap pin is coupled and including:
         a linear section extending in a same direction as the front and rear direction of the first guide hole; and
         a rotation section with an arc shape which extends integrally from the linear section.

6. The active air flap system of claim 5,
   wherein the dual operation is an operation in which the at least one flap rotates around the first flap pin in a state where the first flap pin is positioned on a rear end portion of the first guide hole in the front and rear direction of the vehicle.

7. The active air flap system of claim 6, wherein the second flap pin enters the rotation section and the first flap pin rotates around the first flap pin in a predetermined rotation radius around the first flap pin.

8. The active air flap system of claim 7, wherein a length of the linear section of the second guide hole is a same as a total length of the first guide hole.

9. The active air flap system of claim 1,
wherein a plurality of flaps are provided, and the power transfer mechanism is provided for each of the flaps.

10. The active air flap system of claim 5,
wherein at least one of the first guide hole and the second guide hole is formed in the housing so that a rear end portion of the at least one in the front and rear direction of the vehicle is open, and
wherein a cover configured to cover an open end portion of the at least one of the first guide hole and the second guide hole is coupled to the housing.

11. The active air flap system of claim 10,
wherein at least one of the first guide hole and the second guide hole is formed to extend from the housing to the cover.

12. The active air flap system of claim 1, further including a stopper configured to regulate a rotation range of the first link.

13. The active air flap system of claim 12, wherein the stopper includes:
a guide hole concavely formed in the housing; and
a guide pin formed to protrude from the first link, and inserted into the guide hole to selectively contact with first and second end portions of the guide hole when the first link rotates to regulate rotation movement of the first link.

14. The active air flap system of claim 1,
wherein the housing further includes a mounting hole in which the driveshaft is mounted, and has a second guide hole, a first guide hole, and the mounting hole sequentially provided therein in a predetermined direction, when viewing the housing from a side thereof.

15. The active air flap system of claim 1, further including:
a control unit configured to control the actuator,
wherein the control unit is configured to receive a signal related to at least one of a vehicle speed, an outside air temperature, a refrigerant pressure, and a coolant temperature from a sensor mounted on the vehicle, and controls an amount of opening or closing of the at least one flap based on the received signal.

* * * * *